ns of ropes# United States Patent [19]

McBride

[11] 4,295,749

[45] Oct. 20, 1981

[54] EYE SPLICE FITTING

[76] Inventor: Jack L. McBride, 3622 Barbara St., San Pedro, Calif. 90731

[21] Appl. No.: 66,621

[22] Filed: Aug. 15, 1979

[51] Int. Cl.³ ............................................. F16G 11/04
[52] U.S. Cl. ................................................. 403/211
[58] Field of Search ............... 403/209, 210, 211, 374

[56] References Cited

U.S. PATENT DOCUMENTS

| | | | |
|---|---|---|---|
| 239,834 | 4/1881 | Paldi | 403/374 X |
| 1,600,521 | 9/1926 | Smith | 403/211 |

*Primary Examiner*—Werner H. Schroeder

*Attorney, Agent, or Firm*—Vernon D. Beehler

[57] ABSTRACT

A fitting for anchoring together adjacent sections of rope or cable makes use of a housing with parallel, oppositely positioned frustoconical holes, each adapted to accommodate a pair of complementary wedge sections. Each wedge section of the pair has a semi-cylindrical recess for engaging a corresponding section of rope and a tapered exterior which matches the interior of the corresponding frustonical hole. The two wedge sections engage opposite sides of the section of rope and grasp the rope tightly when drawn into the hole as tension is applied to the rope.

3 Claims, 7 Drawing Figures

U.S. Patent    Oct. 20, 1981    Sheet 1 of 2    4,295,749
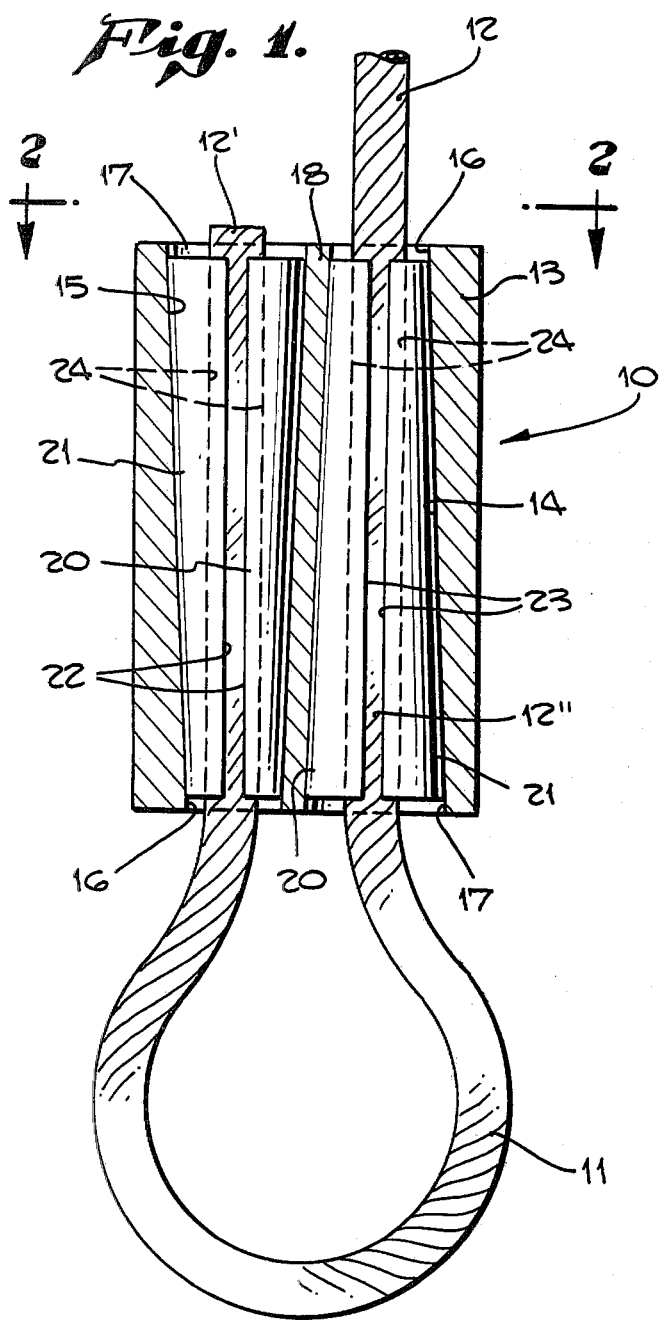
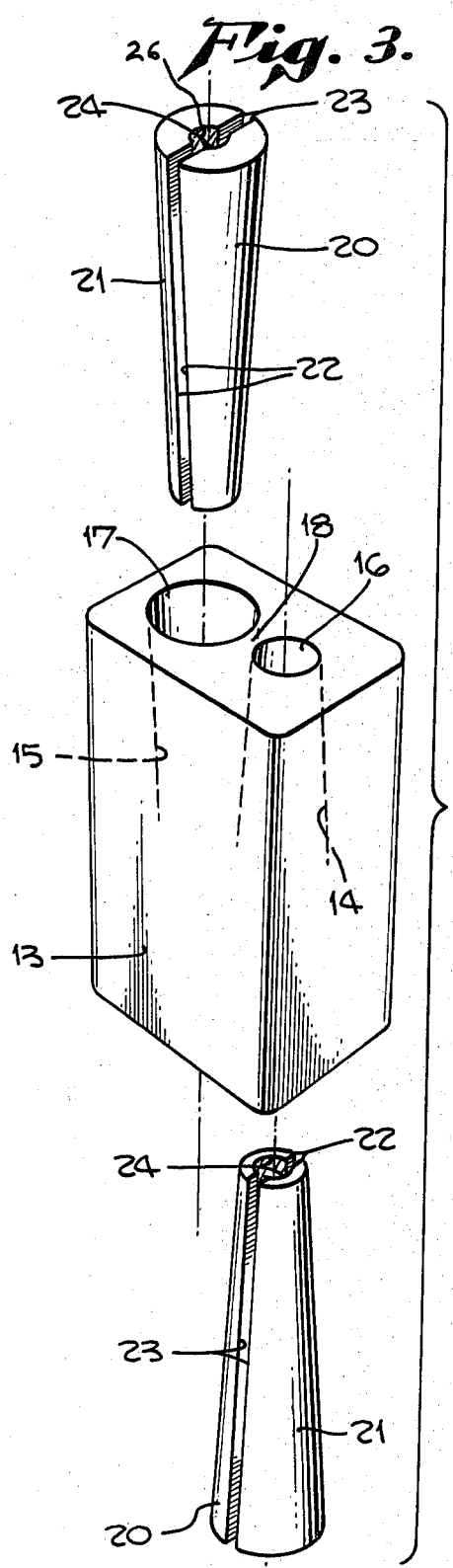
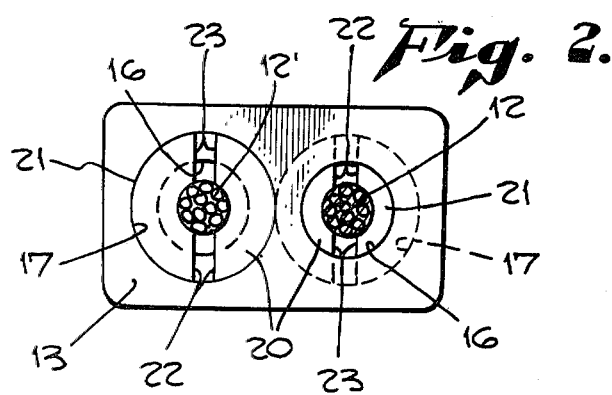

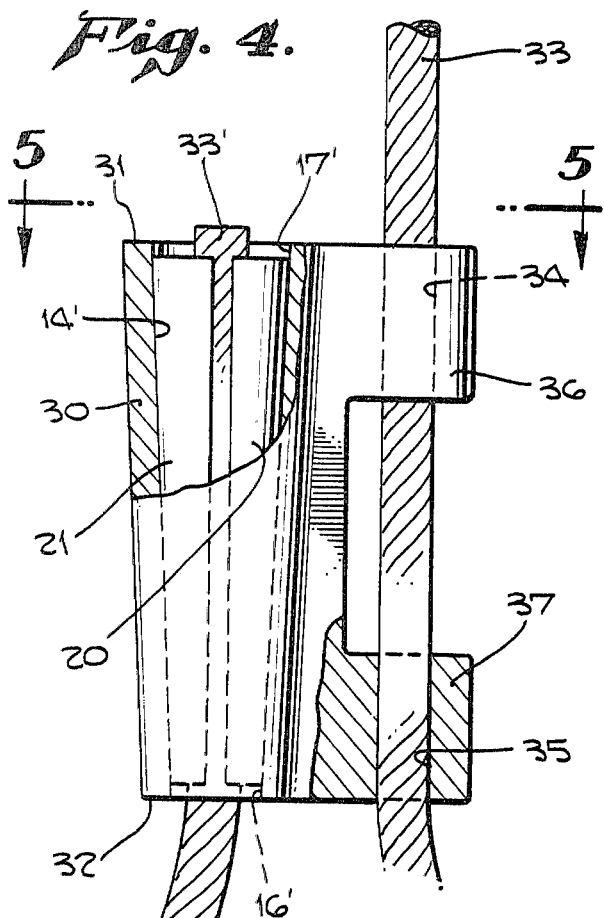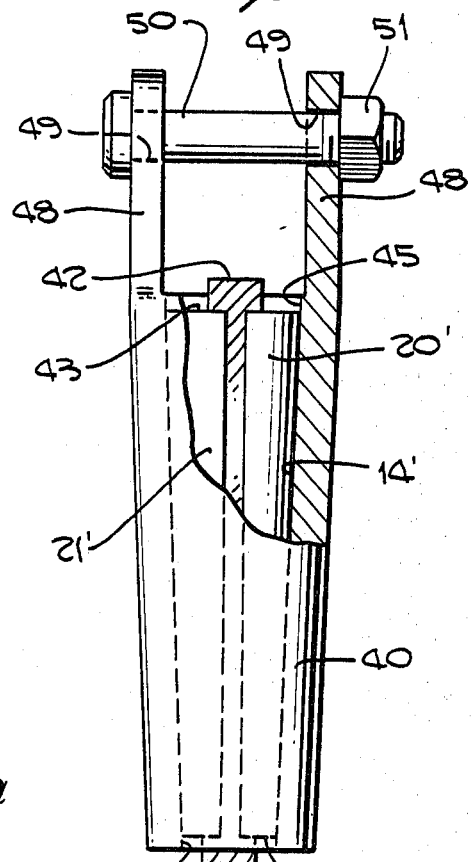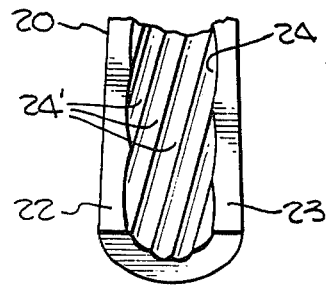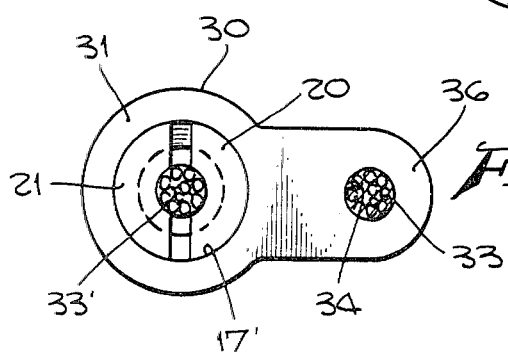

EYE SPLICE FITTING

For the lifting and handling of loads where ropes and cables are involved there is frequent need for providing a loop in the cable. This applies not only to the lifting and handling of cargo such as would be the case for crates, machinery and various objects, but also for tie-down operations where loads need to be tied to what is often a movable platform. There is further need for the splicing of rope and cable where guys and stays are involved. Despite the advent of woven or braided synthetic ropes and ties, a very great percentage of rope and cable consists of twisted strands.

Traditionally a loop has been made in such twisted strands by use of a splice. Splices are particularly effective whether the strand might be a hemp rope or wire cable, because of its dependability, and also because the spliced portion of the strand is relatively small, being actually less bulky than about twice the diameter of the strand itself.

More recently and for various reasons, including economy and the size and bulky character of heavy cables, fittings have been improvised for fastening one section of rope to another in order to form a loop. Some fittings which have heretofore been available have employed a housing or jacket for reception of the strand of cable which is then secured in place by fixing it with molten lead. On other occasions, where equipment is available, a clamp of compressible metal has been made use of which is compressed around the strands in order to anchor them to each other. Although such compressed clamps can be relied upon to an appreciable degree, application of them requires relatively heavy and expensive equipment which is often not available to many users and prospective users of rope and cable in the manner made reference to.

It is therefore among the objects of the invention to provide a new and improved fitting for the splicing together of rope and cable of virtually any size or degree of stiffness, which is of such character that the splice can be readily made by hand and without the use of special tools.

Another object of the invention is to provide a new and improved fitting for the splicing of rope and cable which can be made by hand and which results in a relatively compact connection well-suited to most operations where a loop at the end of a strand may be needed.

Still another object of the invention is to provide a new and improved fitting for the splicing of rope and cable which can be quickly and readily made up in the field without special equipment and by means of which the cable at the loop end can be drawn up to a desired degree of snugness before the splice is ultimately made fast.

Still further among the objects of the invention is to provide a new and improved fitting for the splicing of rope or cable which is of such character that when need be the splice can be disconnected and remade.

Still further among the objects of the invention is to provide a new and improved fitting for the splicing of rope and cable which is very simple in its mode of operation, such that it can be made up by persons of relatively modest skill while at the same time being of such character that once made, the splice is as dependable as the cable itself.

With these and other objects in view, the invention consists of the construction, arrangement, and combination of the various parts of the device, whereby the objects contemplated are attained, as hereinafter set forth, pointed out in the appended claims and illustrated in the accompanying drawings.

FIG. 1 is a side elevational view of the fitting applied to a cable in order to form a loop.

FIG. 2 is a cross-sectional view on the line 2—2 of FIG. 1.

FIG. 3 is an exploded perspective view of the parts of the device of FIG. 1.

FIG. 3a is a fragmentary elevational view of one of the wedge sections.

FIG. 4 is a side elevational view of a second form of the fitting, partially broken away.

FIG. 5 is a cross-sectional view on the line 5—5 of FIG. 4.

FIG. 6 is an end elevational view of another form of the invention.

In one embodiment of the invention chosen for the purpose of illustration, there is shown a fitting indicated generally by the reference character 10 made use of in splicing a loop 11 in a length of cable 12. The cable 12 to be usable in the fitting may be a conventional twisted rope of three or four individual strands for example, or may be a wire cable twisted in a conventional manner where there may be an appreciable number of individual strands. Other types of woven or braided rope or cable may likewise be employed.

In the chosen embodiment, the fitting comprises in particular a housing 13 through which extends a pair of holes 14 and 15, the center lines of which are parallel to each other and spaced relatively close together. The holes 14 and 15 are identical in character, being tapered, or in other words wedge-shaped, which in the chosen embodiment is achieved by having the holes frustoconical in form, with the hole size 16 at one end relatively smaller and the hole size 17 at the opposite end relatively larger. In the form of invention of FIG. 1, the holes 14 and 15 are oppositely positioned so that the relatively smaller hole size 16 of the hole 14 is adjacent the relatively larger hole size 17 of the hole 15. At the opposite end, the hole sizes are reversely positioned. It is also of consequence to note that the holes 14 and 15 are spaced relatively close together so that the mass of material between them provides a relatively thin section 18 where the circumferences of the holes are closest to each other.

For each of the holes 14 and 15 there is provided a plurality of identical wedge sections, here comprising two wedge sections 20 and 21. Longitudinal edges 22 and 23 of adjacent wedge sections 20 and 21 lie opposite and spaced from each other.

For each of the wedge sections, as for example the wedge section 20, there is a semi-cylindrical recess 24 which extends from end to end. The recess preferably has a roughened texture, which for example may consist of grooves 24' complementary to the exterior configuration of the cable which is to be handled. It is significant primarily that the surface be roughened to the extent of providing a dependable friction grip on the cable when the fitting is made up. Roughness 26 is shown in FIG. 3.

It is additionally of consequence to have the depth of the recesses 24 such that when two wedge sections 20 and 21 are applied to opposite sides of the cable 12, the edges 22 and 23 will not meet as the wedge sections are forced against each other, thereby to asure that the walls of the semi-cylindrical recesses 24 will be forced into secure engagement with the cable.

The dimensioning of the depths of the recesses as made reference to, together with providing wedge sections 20 and 21 having a length greater than the length of the holes 14 and 15, results in an assembly such that the wedge sections protrude slightly at the large end. This makes it possible to drive the wedge sections into the holes when the fitting is being made up so that there will be a secure engagement with the rope 12 before tension is applied, for example to a standing section 25.

In making up the fitting, an end section 12' of the cable 12 is passed through the hole 14 in sufficient length to provide the loop 11 and then passed back through the hole 15 leaving a section 12" in the hole 14. Wedge sections 20 and 21 are applied to the outside surface of the cable adjacent the large end 17 of the hole 14 and similarly applied to the cable adjacent the larger end of the hole 15. The wedge sections are then forced into the holes by appropriate means, as for example simply by hand until there is a sufficiently tight grip or finally by driving against the protruding ends. As soon as tension is applied to standing section 25, the corresponding wedge sections are drawn more snugly into engagement with the hole. Where the loop is made fast to a standing object, tension on the cable section which extends through the hole 15 will also draw the corresponding wedge sections into engagement with the hole 15.

Customarily loops of the kind made references to are made up as permanent loops. Should occasion arise where it might be desirable to have the fitting capable of being unmade, the wedge sections can be so proportioned as to protrude slightly at the smaller ends to that the wedge sections can be driven back through the holes to a position where the grip can be released and the wedge sections withdrawn, thereby to unmake the loop.

In the form of invention of FIGS. 4 and 5, a loop form is shown frequently referred to as a honda noose, this being a slip type of loop. For a fitting 30 providing a noose, a single hole 14' is made use of having the same characteristics as the hole 14 described in connection with FIG. 1. In this instance, for a frustoconical hole 14', the end 17' of larger size is at an end 31 of the fitting, the hole end 16' of smaller size being at the end 32. On this occasion an end 33' of the cable 33 is anchored in the same manner as has been heretofore described. A portion of the cable, however, extends through holes 34 and 35 in respective flanges 36 and 37. By making the holes 34 and 35 slightly larger in diameter than the diameter of the cable, a loop 38 is formed which can be drawn smaller in the manner similar to a slip knot.

On those occasions where a single fitting 40 may be appropriate, attached to a cable 41 at the end 42 there is provided in the fitting a hole 14" precisely the same as hole 14 described in connection with FIG. 1. Similar wedge sections 20' and 21' are employed, the wedge sections forming a plug with a larger end 43 and a smaller end 44. The larger end in the made up fitting will lie within the larger end 45 of the hole 14" and the smaller end of the plug will lie within the smaller end 46 of the hole 14".

As shown, the fitting 40 may have a pair of flanges 48, each provided with a hole 49 for reception of a conventional bolt 50 secured by nut 51 for attachment to a ring, a handle, or other appropriate fixture to which the cable is to be made fast.

Having described the invention, what is claimed as new in support of Letters Patent is as follows:

1. A fitting for anchoring therein a section of a rope-like strand comprising a housing having a hole extending therethrough, said hole having a frustoconical interior shape with a small end thereof greater in diameter than the diameter of said rope-like strand, a pair of longitudinally separated wedge sections which when placed together comprise a composite plug having a furstoconical exterior complementary to the frustoconical interior of the hole in the housing, each said wedge section having a semi-cylindrical recess presenting an arcuate surface extending from end to end with a curvature substantially matching the curvature on the surface of the strand, said wedge sections being adapted to fit around opposite sides of the strand and jamb into the hole whereby to anchor the strand in the housing, the combined depths of the semi-cylindrical recesses being less than the diameter of the rope-like strand, said housing having a second hole substantially parallel to the first hole, said second hole having a smooth interior of diameter greater than the diameter of said rope-like strand.

2. A fitting for anchoring together adjacent sections of a rope-like strand comprising a housing having laterally spaced substantially parallel holes extending therethrough, each hole having a tapered interior shape with an angle such that the hole size at one end is only slightly smaller and the hole size at the opposite end slightly larger, said holes being oppositely positioned, end for end, so that the smaller hole size of one hole lies adjacent the larger hole size of the other hole, a plurality of complementary longitudinally separated wedge sections for each hole which when placed together comprise a composite plug having a tapered exterior shape complementary to the tapered interior shape of the hole, each wedge section having a semi-cylindrical recess presenting an arcuate surface extending from end to end with a curvature substantially matching the curvature of the strand of one side and of depth less than one-half the diameter of the strand, said wedge sections being adapted to fit around the surface of the strand and jamb into the respective hole whereby to anchor the strand in the fitting, said composite plugs having each a length no greater than the length of one of said holes, the material of the housing between said holes being solid and the longitudinal centerlines of the parallel holes being spaced apart a distance no greater than substantially the diameter of the hole sizes of the large ends of the holes.

3. A fitting for anchoring together adjacent sections of a rope-like strand comprising a housing having laterally spaced substantially parallel holes extending therethrough, each hole having a tapered interior shape with an angle such that the hole size at one end is only slightly smaller and the hole size at the opposite end slightly larger, said holes being oppositely positioned, end for end, so that the smaller hole size of one hole lies adjacent the larger hole size of the other hole, a plurality of complementary longitudinally separated wedge sections for each hole which when placed together comprise a composite plug having a tapered exterior shape complementary to the tapered interior shape of the hole, each wedge section having a semi-cylindrical recess presenting an arcuate surface extending from end to end with a curvature substantially matching the curvature of the strand on one side and of depth less than one-half the diameter of the strand, said wedge sections being adapted to fit around the surface of the strand and jamb into the respective hole whereby to anchor the strand in the fitting, said composite plugs having each a length no greater than the length of one of said holes, the thickness of the housing material separating said substantially parallel holes at the thinnest section of said material being no greater than half the diameter of the smaller of said hole sizes.

* * * * *